TheUS011374748B2

United States Patent
Hosur et al.

(10) Patent No.: US 11,374,748 B2
(45) Date of Patent: Jun. 28, 2022

(54) CACHE MANAGEMENT FOR ENCRYPTION KEY ROTATION

(71) Applicant: salesforce.com, inc., San Francisco, CA (US)

(72) Inventors: Vadiraj Govardhan Hosur, Santa Clara, CA (US); Andrew Tucker, Redmond, WA (US); Terry Chong, Pleasanton, CA (US); Raghavendran Hanumantharau, Fremont, CA (US); Dhanashree Kashid, San Jose, CA (US); Scott Daniel Wisniewski, Issaquah, WA (US); Prithviraj Vasanth, San Francisco, CA (US); Pranesh Radhakrishnan, Vancouver (CA)

(73) Assignee: salesforce.com, inc., San Francisco, CA (US)

( * ) Notice: Subject to any disclaimer, the term of this patent is extended or adjusted under 35 U.S.C. 154(b) by 133 days.

(21) Appl. No.: 16/849,401

(22) Filed: Apr. 15, 2020

(65) Prior Publication Data

US 2021/0328789 A1    Oct. 21, 2021

(51) Int. Cl.
*H04L 9/08* (2006.01)
*G06F 21/60* (2013.01)
*G06F 21/62* (2013.01)

(52) U.S. Cl.
CPC .......... *H04L 9/0891* (2013.01); *G06F 21/602* (2013.01); *G06F 21/6227* (2013.01); *H04L 9/0894* (2013.01); *G06F 2221/2107* (2013.01)

(58) Field of Classification Search
CPC ... H04L 9/0891; H04L 9/0894; G06F 21/602; G06F 21/6227
USPC .................................................. 380/277
See application file for complete search history.

(56) References Cited

U.S. PATENT DOCUMENTS

| 7,111,005 B1* | 9/2006 | Wessman | G06F 21/604 |
| 7,797,342 B2 | 9/2010 | Banks et al. | |
| 2011/0191594 A1* | 8/2011 | Bartlett | G06F 21/602 713/189 |
| 2016/0105283 A1* | 4/2016 | Mityagin | H04L 63/068 380/279 |
| 2017/0004093 A1* | 1/2017 | Susarla | G06F 11/3466 |
| 2019/0097791 A1* | 3/2019 | Hersans | G06F 12/0875 |

* cited by examiner

*Primary Examiner* — Kambiz Zand
*Assistant Examiner* — Phuc Pham
(74) *Attorney, Agent, or Firm* — Kowert, Hood, Munyon, Rankin & Goetzel, P.C.; Michael B. Davis; Dean M. Munyon (57) ABSTRACT

Disclosed techniques relate to caching tenant encryption keys for a multi-tenant database. In some embodiments, a computing system encrypts data for a database in a multi-tenant database system using encryption keys assigned to respective tenants that are using the database. The computing system may store the encryption keys in a cache and, in response to a key rotation request for a first tenant, invalidate an entry in the cache for the first encryption key of the first tenant. The computing system may block writes for the first tenant until a new key is cached (e.g., based on retrieval from a key management system). In various embodiments, disclosed techniques may reduce encryption latency.

18 Claims, 6 Drawing Sheets

Fig. 1A

Tenant to key ID mapping table

| Tenant ID | Key ID |
|---|---|
| Tenant A | Key 3 |
| Tenant K | Key 1 |
| Tenant C | Key 7 |

Key ID to key material mapping table

| Key ID | Key Material |
|---|---|
| Key 3 | Key 3 material |
| Key 1 | Key 1 material |
| Key 7 | Key 7 material |

CACHE MANAGEMENT FOR ENCRYPTION KEY ROTATION

BACKGROUND

Technical Field

Embodiments described herein relate to database technology and, in particular, to caching encryption keys and key rotation.

Description of the Related Art

Database systems often encrypt data before storage and decrypt the data on retrieval, e.g., to increase data security. Encryption keys may be fetched from a centralized key management system (KMS). In multi-tenant database systems, the system may use different encryption keys for different tenants that store information in the same database table. Keys may be rotated periodically or tenants may request key rotation. Any delays associated with fetching keys may add latency to the encryption process.

This disclosure includes references to "one embodiment," "a particular embodiment," "some embodiments," "various embodiments," "an embodiment," etc. The appearances of these phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. For example, a "database module configured to access a data store" is intended to cover, for example, equipment that has a program code or circuitry that performs this function during operation, even if the circuitry in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the words "can" and "may" are used throughout this application in a permissive sense (i.e., having the potential to, being able to), not in a mandatory sense (i.e., must). The term "include," "comprise," and derivations thereof, mean "including, but not limited to." The term "coupled" means directly or indirectly connected.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used herein, the term "or" is used as an inclusive or and not as an exclusive or. For example, the phrase "at least one of x, y, or z" means any one of x, y, and z, as well as any combination thereof (e.g., x and y, but not z or x, y, and z).

DETAILED DESCRIPTION

In various disclosed embodiments, a database system is configured to cache encryption keys for multiple tenants and manage the cached keys to facilitate key rotation and other database operations. The database system may store data for multiple tenants in the same logical database table but may use different encryption keys for the different tenants. The database system may cache the different encryption keys and may handle key rotation for a particular tenant by invalidating a corresponding cache entry. The database system may block writes for the rotating tenant until a new key arrives in the cache, but may allow encryption and writes for other tenants to continue. Disclosed techniques may advantageously reduce encryption latency and may reduce or avoid interference between tenants.

Example Key Rotation Techniques with Key Cache

Figure 1A:
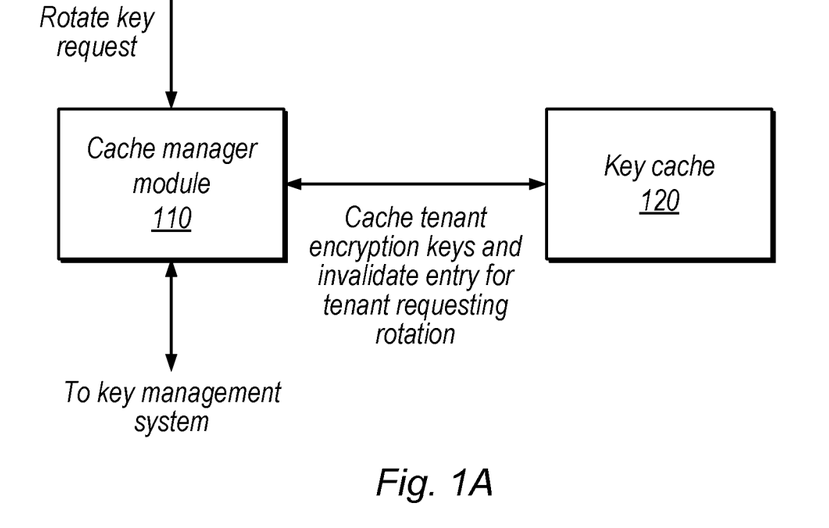
FIG. 1A is a block diagram illustrating an example system that includes a key cache and cache manager module, according to some embodiments.

FIG. 1A is a block diagram illustrating an example multi-tenant database system configured to handle key rotation, according to some embodiments. In the illustrated embodiment, the system includes cache manager module 110 and key cache 120.

Cache manager module 110, in the illustrated embodiment, is configured to receive a key rotation request. Cache manager module 110 is configured to request encryption keys from a key management system (not explicitly shown), which may be implemented by another server. Cache manage module 110 is configured to cache tenant encryption keys using cache 120. When there is a cache miss, module 110 may request a new key from the key management system and allocate an entry in cache 120 for the new key.

Figure 2:
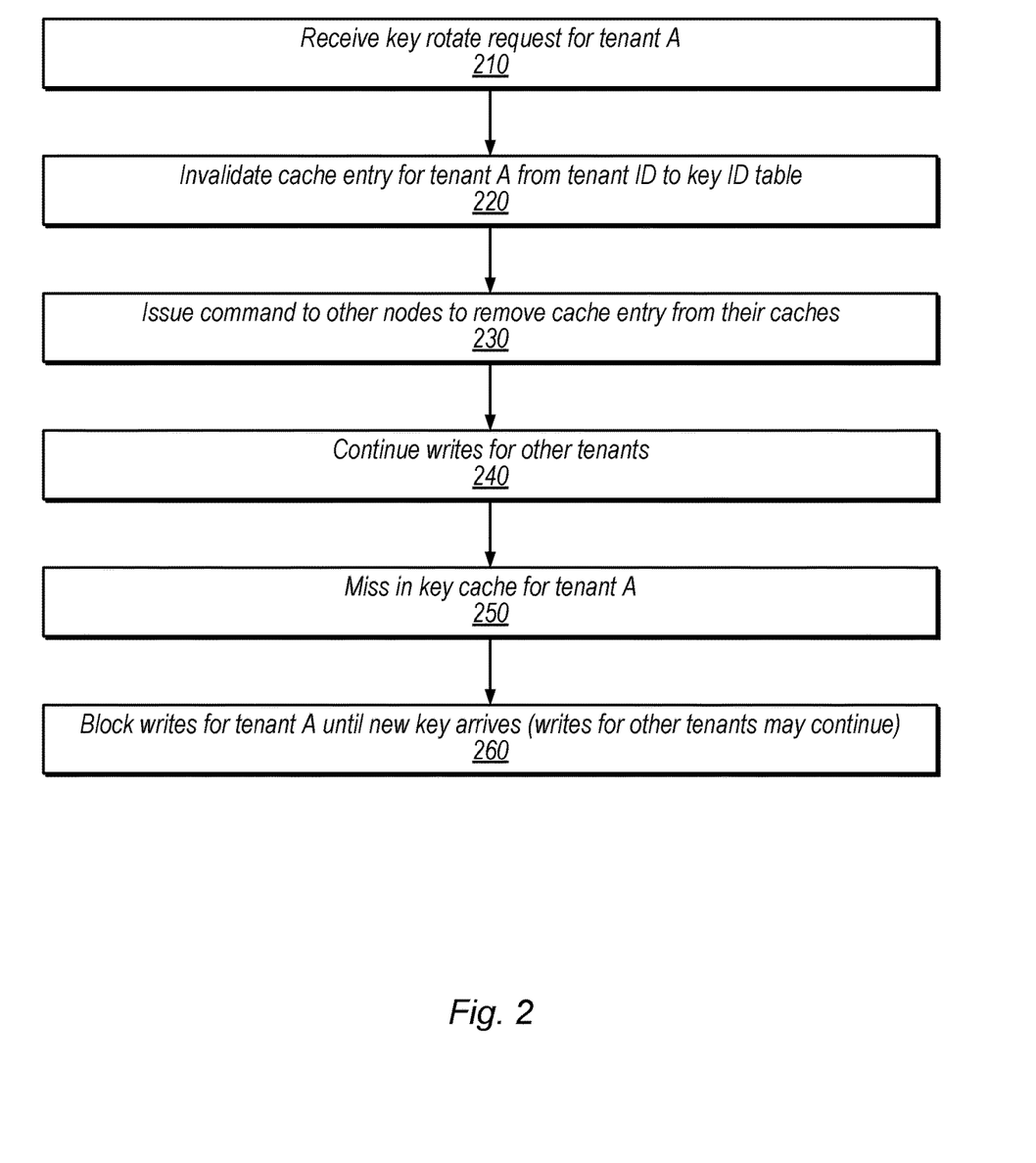
FIG. 2 is a flow diagram illustrating an example method for key rotation, according to some embodiments.

In some embodiments, cache manager module 110 is configured to invalidate (e.g., remove, mark as invalid, etc.) a corresponding entry in key cache 120 in response to a key rotation request from a tenant. Cache manager module 110 may also issue a command to other nodes to invalidate their corresponding cache entry. The system may continue writes for other tenants but may block writes for the rotating tenant until the new key arrives (e.g., block while there are misses in the key cache for that tenant). FIG. 2, discussed in detail below, shows an example key rotation technique.

Figure 1B:
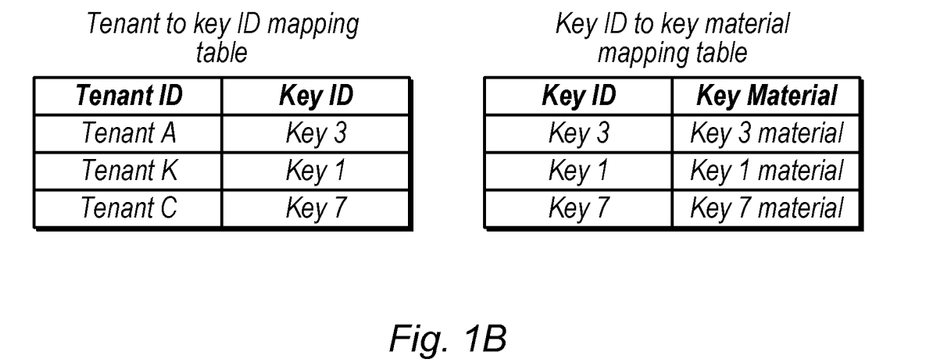
FIG. 1B is a diagram illustrating an example key cache with split mapping tables, according to some embodiments.

FIG. 1B is a diagram illustrating an example key cache implementation with multiple mapping tables, according to some embodiments. In the illustrated example, the tenant to key ID mapping table includes entries that map tenant identifiers to identifiers of encryption keys. The key ID to key material mapping table then maps key IDs to encryption key material. In some embodiments, the system is configured to remove the entry for a tenant in the tenant to key ID mapping table in response to a key rotation request. When a new key arrives, the system creates a new entry for that tenant to point to an allocated entry in the key ID to key material mapping table for the new key.

In the illustrated example, the tenant ID field acts as a tag for the tenant to key ID mapping table and the key ID acts as a tag for the key ID to key material mapping table. Each entry may include additional fields such as a validity field, one or more fields with information about use of entry (e.g., which may be used to select entries for eviction according to a cache replacement policy), etc. Cache fields may be evicted to make room for new entries, in some embodiments. On a cache miss, the system may request a new key from the key management system. Cache 120 may be implemented in the database using one or more database tables, may be a hardware cache, or may be otherwise implemented using any appropriate combination of hardware and software.

In some embodiments, the split table may advantageously provide security. For example, each tenant's data and key ID may be persisted but the key material may be maintained outside of the database (e.g., in a key management system).

With a split cache, an entity with access to the tenant data would still need access to the key management system to decrypt the data, in some embodiments. Further, a split cache may keep key management out of the database and allow for quick updating of the tenant to key ID mapping, while the key ID to key material mapping may be a local cache of information maintained by the key management system.

FIG. 2 is a flow diagram illustrating an example key rotation technique, according to some embodiments. The method shown in FIG. 2 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 210, in the illustrated embodiment, a database server receives a key rotate request for tenant A. At 220, in the illustrated embodiment, the database server invalidates a cache entry for tenant A from the tenant ID to key ID table. The database server (or some other entity such as an application server initiating the key rotate request) may request a new key from a key management system (KMS) at this time.

At 230, in the illustrated embodiment, the database server issues a command (e.g., a redo or a replicate command) to one or more other database nodes (e.g., one or more standby nodes) to invalidate the corresponding cache entry from their caches. This may ensure correct option for those nodes as well (e.g., to prevent later use of an old key). Thus, in some embodiments, valid cache entries always correspond to active keys because entries are invalidated for key rotations.

At 240, in the illustrated embodiment, the database server continues writes for one or more other tenants. For example, as discussed in further detail below with reference to FIG. 3, the database server may encrypt and write other fragments, for other tenants, to a data extent in encrypted storage.

At 250, in the illustrated embodiment, the database server misses in the key cache for tenant A (e.g., as a result of the invalidation performed for element 220 of FIG. 2). For example, one or more write operations for tenant A that require encryption may cause an access to the cache, which misses.

At 260, in the illustrated embodiment, the database server blocks writes for tenant A until the new key arrives (at which point a hit may occur in the cache). The database system may periodically check the cache for tenant A or may receive an indication (e.g., from the key management system) when the key arrives, such that writes for tenant A can continue. Note that, during the blocking for tenant A, encryption and writes for other tenants may continue.

In various embodiments, the disclosed techniques may advantageously avoid use of inactive keys for key-rotating tenants while reducing or avoiding interference with writes for other tenants in a multi-tenant system.

Example System with Key Caching and Rotation

Figure 3:
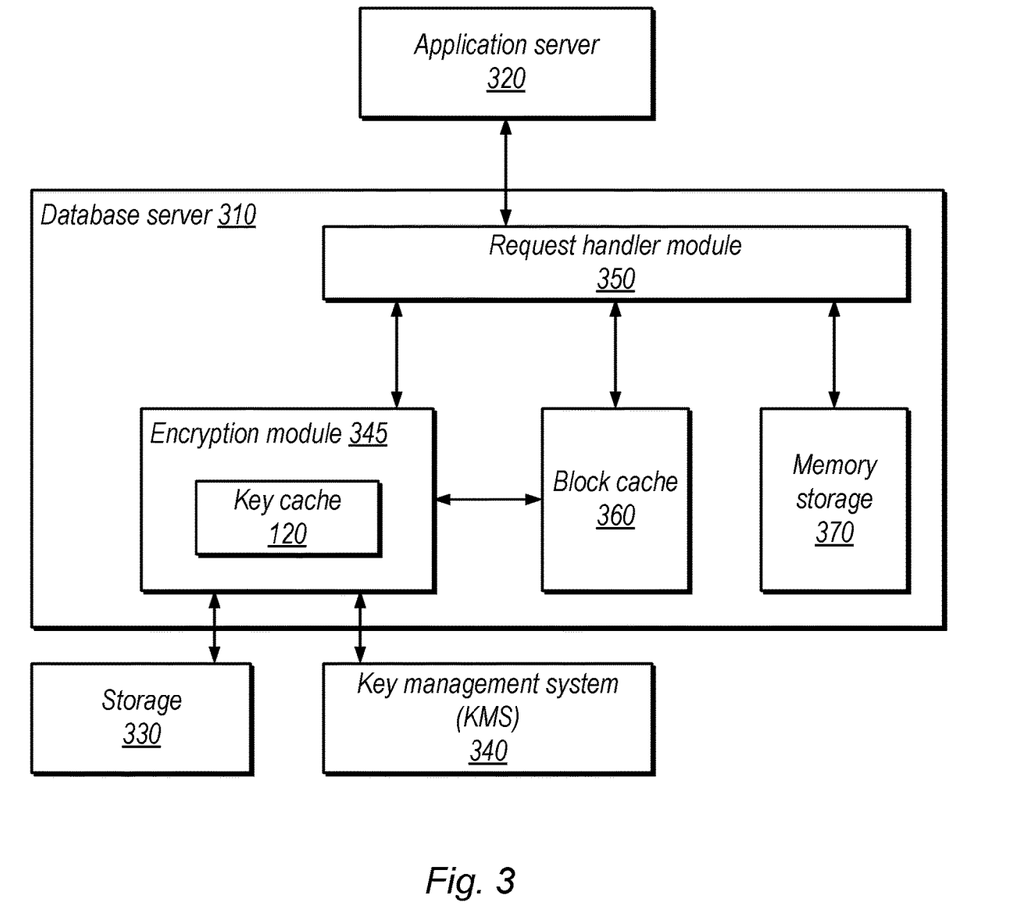
FIG. 3 is a block diagram illustrating a more detailed example system that includes a database server, according to some embodiments.

FIG. 3 is a block diagram illustrating an example system that implements key caching and rotation, according to some embodiments. In the illustrated embodiment, the system includes database server 310, application server 320, storage 330, and key management system 340.

Database server 310, in the illustrated embodiment, includes an encryption module 345 (which in turn includes key cache 120), request handler module 350, block cache 360, and memory storage 370. Request handler module 350, in the illustrated embodiment, handles requests from application server 320. Database server 310 may store tenant data in various locations, including storage 330, block cache 360, and memory storage 370. Request handler module 350 may determine the location of data relevant to requests and route the requests to the appropriate module.

Encryption module 345, in some embodiments, is configured to encrypt data for storage in storage element 330 and decrypt data read from storage element 330. In the illustrated embodiment, encryption module 345 includes key cache 120 and is configured to communicate with key management system 340 to retrieve tenant keys for storage in cache 120 until they are rotated. In some embodiments, storing keys in key cache 120 and invalidating them for key rotation may advantageously reduce or avoid certain delays during handshaking procedures with key management system 340. In some embodiments, encryption module 345 includes the cache manager module 110 of FIG. 1.

In some embodiments, encryption module 345 is configured to implement the techniques of FIG. 2 discussed above. As discussed above, in response to invalidating a key in key cache 120 (e.g., by removing the entry, marking the entry as invalid, etc.), database server 310 may issue a command to other nodes to similarly invalidate their corresponding entries.

Storage element 330, in some embodiments, is shared among multiple different database servers and implements database storage. In some embodiments, encrypted data in storage element 330 is organized into data extents that each may include multiple fragments (where a given fragment includes data that is encrypted a given tenant's encryption key). Therefore, in some embodiments, each fragment may include data for only a single tenant. Some data extents may include multiple fragments for a given tenant. Storage element 330 may also include a block index per data extent that identifies the fragments included in the extent. For example, the index may include index numbers of a database table in storage 330 for the fragments in the data extent. In some embodiments, the block index is encrypted using a system encryption key. In some embodiments, encryption module 345 may continue to write encrypted fragments within a data extent for other tenants while one of the tenants sharing the data extent is waiting for a new encryption key. In some embodiments, the system maintains a storage catalog to indicate the locations of data extents in storage 330.

Storage element 330 (and the other various storage elements discussed herein) may be physical data storage, such as semiconductor memory, a solid state drive (SSD), hard disk drive, optical memory, an optical storage device, or any other suitable physical data storage medium, or some combination thereof.

Block cache 360, in some embodiments, is configured to store unencrypted data fragments and may also store an unencrypted version of the corresponding block index. Database server 310 may perform various operations on the unencrypted data in block cache 360, such as filtering, sorting, indexing, etc. Therefore, block cache 360 may facilitate operations on data in storage 330 without a need to decrypt/encrypt data for each operation.

Memory storage 370, in some embodiments, is configured to store committed and/or uncommitted transaction data for tenants of the multi-tenant database system. In some embodiments, encryption module 345 may access data in memory storage 370 for encryption and storage in storage 330, in certain situations.

Disclosed embodiments provide encryption for multitenant database systems, where database operations such as filtering, sorting, and indexing, and the like for tenant data that is stored in an encrypted form are supported. Encryption of the tenant data may be performed by the multitenant database system, rather than at an application server, so that database operations (e.g., filtering, sorting, and the like) may be utilized. Each tenant of the multitenant database system may be separately encrypted, where each tenant has its own tenant identifier and encryption key. In the multitenant database system, portions of different tenant data may logically belong to at least one of the same database object (e.g., database table).

In particular, fragments which contain records of tenant data for a particular tenant may be encrypted. Fragments may be the basic data unit in the multitenant database system of the disclosed subject matter, with multiple fragments making up an extent. The data extents may include one or more fragments of tenant data and block indices. Fragments may be segregated based on a tenant identifier, and the segregated fragments may be individually encrypted using the encryption key for the tenant of that fragment.

In disclosed embodiments, a memory storage of the multitenant database system of the disclosed subject matter may include both committed and uncommitted transactions that have not been written to persistence in the multitenant database. The committed transactions may be encrypted before being written to persistence, e.g., in storage element 330. In some implementations, the multitenant database system use a daemon to manage the segregation of tenant data of the transactions to be committed into fragments. That is, different tenants may be segregated for purposes of encryption. A key cache may store encryption keys for each tenant. Keeping copies of the encryption keys in key cache may reduce the time overhead of retrieving the encryption keys from a Key Management System (KMS). Further, disclosed key rotation techniques may advantageously reduce encryption latency, e.g., by reducing interference by a rotating tenant with operations with other tenants.

When a query is received by the multitenant database system for particular tenant data, a block cache may be initially checked by the query engine of the multitenant database system to determine if the data is unencrypted and available, as this may be quicker than retrieving it from the database. The query engine of the multitenant database system may operate to retrieve tenant data when the data in the block cache is unencrypted (i.e., the data is plain text, and not cypher text). If the data is not available in block cache, the requested tenant data may be retrieved from immutable storage where it is stored in encrypted form. The tenant data may be decrypted and provided to the block cache so that it may be used by the query engine to perform a database operation (e.g., filter, sort, or the like). In particular, the multitenant database system may retrieve the metadata having the tenant identifier from the header of the data fragment of the tenant data identified by the query engine, and may retrieve the encryption key from the key cache or the KMS to decrypt the data fragment based on the retrieved metadata. The requestor may be authenticated (e.g., via certificate) before it may retrieve the encryption key for a particular tenant from the key cache or the KMS. The decrypted data fragment (which has been decrypted from cypher text to plain text) may be provided to the block cache to perform database operations.

That is, implementations of the disclosed subject matter may encrypt tenant data with encryption keys that are specific to each tenant. Fragments of tenant data may be encrypted and stored in the immutable storage of the multitenant database system. Encrypted tenant data may be retrieved from the immutable storage based on metadata in a non-encrypted header. The retrieved encrypted data may be decrypted using a key retrieved from the key cache or KMS, and the decrypted data may be provided to the block cache, where database operations may be performed. Cross-tenant data (e.g., block indices, transaction logs, and the like that include one or more tenants) may be encrypted and decrypted using a system encryption key that is different from any of the tenant encryption keys.

Implementations of the disclosed subject matter may provide key management for tenant encryption, such as rotation of keys that are managed by the multitenant database system. The key management may include management of tenant encryption keys, system encryption keys to encrypt cross tenant data, and/or creation and deletion of encryption keys. In some implementations, encryption keys (e.g., tenant encryption keys and/or system encryption keys) may be rotated (i.e., changed) at a predetermined cadence to maintain security. In some implementations, users may request key rotation (for security purposes), and the corresponding data may be re-written as a new version with the new key in a separate data extent.

Example Key Cache Pre-Fetch Techniques

In some embodiments, encryption module 345 is configured to pre-fetch encryption keys into key cache 120 in certain situations. This may involve requesting keys from key management system 340 and caching the keys once they are received. Examples of such situations include flush or merge operations and database bootup.

In some embodiments, the system maintains a list of tenants that have active data in memory (e.g., in memory storage 370). Active data may be data that is un-flushed or un-merged, for example. If these tenants do not already have active security keys in key cache 120, encryption module 345 may pre-fetch keys for those tenants. In some embodiments, the system is configured to wait until the list of tenants needing keys reaches a threshold value and then send a bulk key fetch request. Key management system 340 may implement a bulk load API to handle this request. In some embodiments, this may allow key cache 120 to be populated in time for the data that is being flushed or merged to be ready and may reduce encryption latency for the operation.

In some embodiments, encryption module 345 is configured to issue a bulk key fetch request in association with boot-up of the database system (e.g., a cold bring-up). In some embodiments, the number of requested keys may be based on the relationship between the number of tenants and the size of the key cache 120. For example, in some embodiments, if keys for all the current tenants can be stored in key cache 120 then encryption module 345 may request keys for all tenants. Otherwise, encryption module 345 may select a smaller number of tenants for the batch request in order to fill only a threshold portion of the cache (e.g., 50%, 60%, 70%, etc.). This may reduce cache thrashing while improving encryption performance by pre-loading keys for a portion of the current tenants.

Example Method

Figure 4:
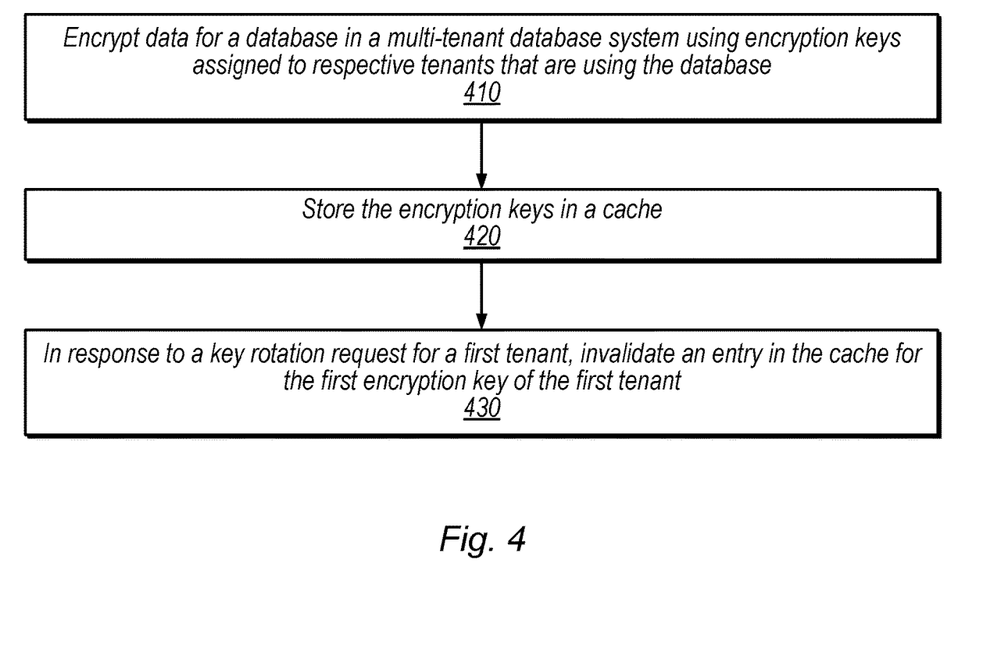
FIG. 4 is a flow diagram illustrating another example method, according to some embodiments.

FIG. 4 is a flow diagram illustrating a method for caching runtime state, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a computing system encrypts data for a database in a multi-tenant database system using encryption keys assigned to respective tenants that are using the database. For example, the system may encrypt data fragments using different tenant encryption keys for storage in a data extent. In some embodiments, the encrypted data includes data from a database table that includes entries for multiple tenants, where the encrypted data includes a plurality of fragments, and where each fragment is encrypted using the encryption key of only one of the tenants.

At 420, in the illustrated embodiment, the computing system the encryption keys in a cache (e.g., using key cache 120). In some embodiments, the storing includes storing a mapping between the first tenant and an identifier of the first key in the cache and storing a mapping between the identifier of the first key and key material of the first key in the cache, e.g., as shown in FIG. 1B.

At 430, in the illustrated embodiment, in response to a key rotation request for a first tenant, the computing system invalidates an entry in the cache for the first encryption key of the first tenant. In some embodiments, the invalidating invalidates the mapping between the first tenant and an identifier of the first key in the cache. In some embodiments, the method includes generating a command for another node in a cluster to invalidate the first encryption key of the first tenant from its cache.

In some embodiments, the method includes blocking one or more writes for the first tenant until an entry for the new key is allocated in the cache. In some embodiments, the system performs one or more writes for one or more other tenants during the blocking, using stored encryption keys in the cache for the one or more other tenants. The writes for the other tenants may be for separate fragments in the same data extent as the blocked writes for the first tenant or in other data extents.

In some embodiments, the method includes maintaining a list of tenants that have active data in memory associated with a flush or merge operation and, in response to the list reaching a threshold number of tenants, issuing a bulk key fetch from a key management system and storing fetched keys from the bulk key fetch in the cache.

In some embodiments, the method includes determining a number of tenants associated with the database, and, in response to the number of tenants being greater than a number of entries in the cache, selecting a portion of the tenants for a bulk key fetch into the cache, wherein the selected portion does not fill the cache. As discussed above, this may reduce or avoid cache thrashing in certain scenarios.

In some embodiments, invalidating the first encryption key is performed in response to receipt of a new key for the first tenant and the encrypting uses the first key during an interval between the key rotation request and receipt of the new key. This may allow use of a stale encryption key but may reduce encryption latency.

Example Multi-Tenant Database System

Figure 5:
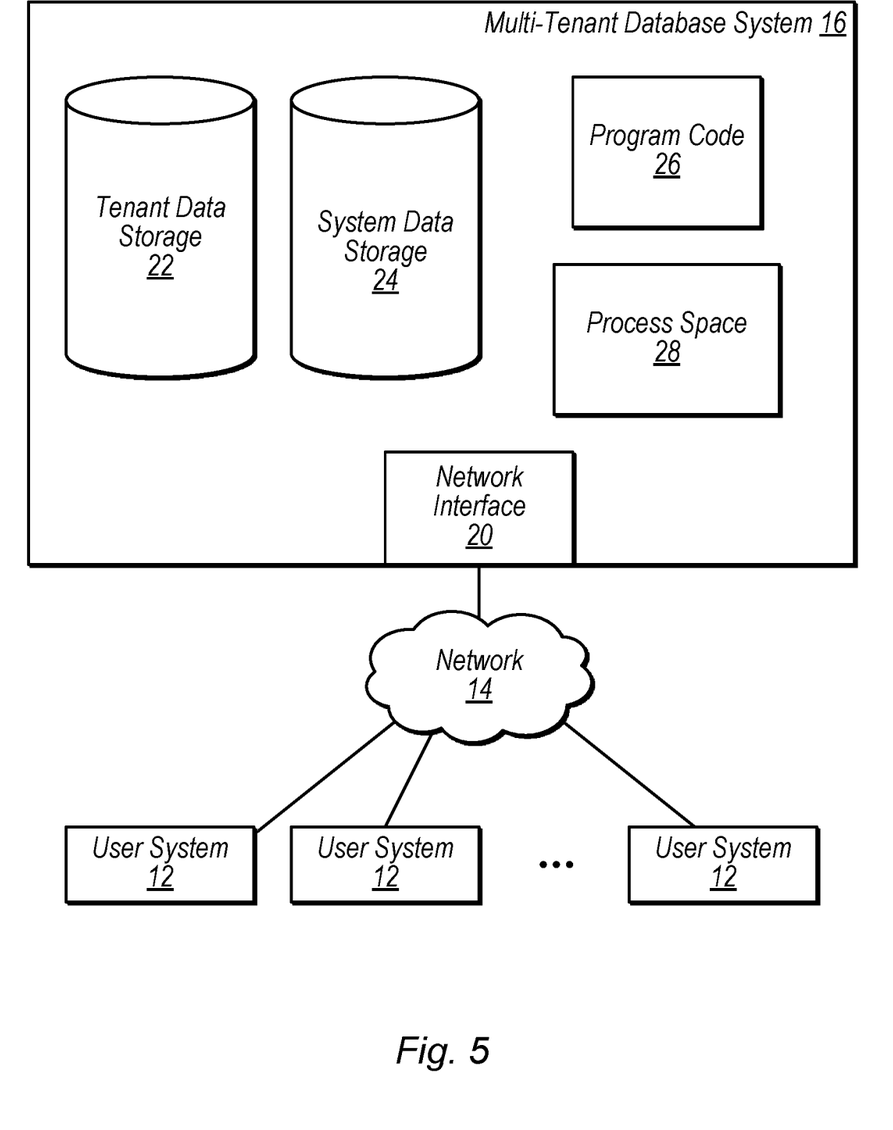
FIG. 5 is a diagram illustrating an example multi-tenant database system, according to some embodiments.

FIG. 5 illustrates an exemplary environment in which a multi-tenant database system might be implemented. As illustrated in FIG. 5 (and in more detail in FIG. 6) one or more user systems 12 may interact via a network 14 with a multi-tenant database system (MTS) 16. The users of those user systems 12 may be users in differing capacities and the capacity of a particular user system 12 might be determined by the current user. For example, when a salesperson is using a particular user system 12 to interact with MTS 16, that user system 12 may have the capacities allotted to that salesperson. However, while an administrator is using the same user system 12 to interact with MTS 16, it has the capacities allotted to that administrator.

Network 14 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

User systems 12 may communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such a server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least for the users that are accessing a server.

In some embodiments, the system shown in FIG. 5 implements a web-based customer relationship management (CRM) system. For example, in some embodiments, MTS 16 includes application servers configured to implement and execute CRM software applications as well as provide related data, code, forms, web pages and other information to and from user systems 12 and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared. Tenants may share the same data structures, however, even when data is kept separate. For example, multiple tenants have data stored in a given database table (e.g., in different rows of the table).

One arrangement for elements of MTS 16 is shown in FIG. 5, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 5 may include conventional, well-known elements that need not be explained in detail here. For example, each user system 12 may be a desktop personal computer, workstation, laptop, PDA, cell phone, or any WAP-enabled device or any other computing device capable of interfacing directly or indirectly to the Internet or other network connection. User system 12 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process, and view information and pages available to it from MTS 16 over network 14. Each user system 12 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 16 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 12 and its components are operator configurable using applications, such as a browser, that include computer code executable on one or more processing elements. Similarly, in some embodiments, MTS 16 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript.

According to one embodiment, each MTS 16 is configured to provide web pages, forms, applications, data, and/or media content to user systems 12 to support the access by user systems 12 as tenants of MTS 16. As such, in this embodiment, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 6:
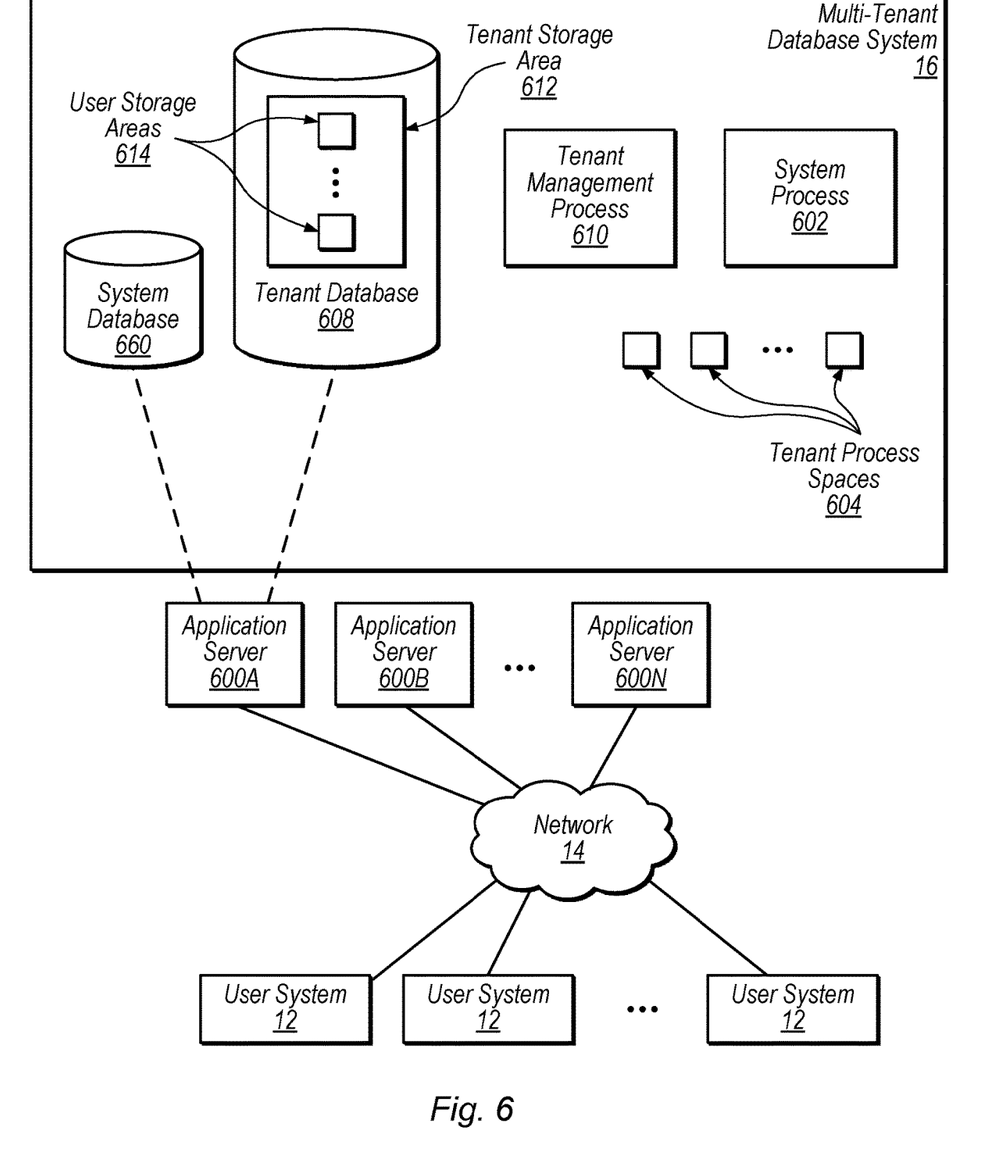
FIG. 6 is a diagram illustrating a more detailed example multi-tenant database system, according to some embodiments.

FIG. 6 illustrates exemplary embodiments of an MTS 16 and various interconnections in more detail. In this example, the network interface is implemented as one or more HTTP application servers 600. These application servers may be of different types or may implement similar functionality. Also shown is system process space 602 including individual tenant process spaces 604, a system database 606, tenant database(s) 608 and a tenant management process space 610. Tenant database 608 might be divided into individual tenant storage areas 612, which can be either a physical arrangement or a logical arrangement. Within each tenant storage area 612, user storage 614 might be allocated for each user.

It should also be understood that each application server 600 may be communicably coupled to database systems, e.g., system database 606 and tenant database(s) 608, via, a different network connection. For example, one server 600 I might be coupled via the Internet 14, another server 600 N-1 might be coupled via a direct network link, and another server 600 N might be coupled by yet a different network connection. Transfer Control Protocol and Internet Protocol (TCP/IP) are preferred protocols for communicating between servers 600 and the database system, however, it will be apparent to one skilled in the art that other transport protocols may be used to optimize the system depending on the network interconnect used.

In preferred aspects, each application server 600 is configured to handle requests for any user/organization. Because it is desirable to be able to add and remove application servers from the server pool at any time for any reason, there is preferably no server affinity for a user and/or organization to a specific application server 600. In one embodiment, therefore, an interface system (not shown) implementing a load balancing function (e.g., an F5 Big-IP load balancer) is communicably coupled between the servers 600 and the user systems 12 to distribute requests to the servers 600. In one aspect, the load balancer uses a least connections algorithm to route user requests to the servers 600. Other examples of load balancing algorithms, such as are round robin and observed response time, also can be used. For example, in certain aspects, three consecutive requests from the same user could hit three different servers, and three requests from different users could hit the same server. In this manner, MTS 16 is multi-tenant, wherein the MTS 16 handles storage of different objects and data across disparate users and organizations.

As an example of storage, one tenant might be a company that employs a sales force where each salesperson uses MTS 16 to manage their sales process. Thus, a user might maintain contact data, leads data customer follow-up data, performance data, goals and progress data, all applicable to that user's personal sales process (e.g., in tenant database 608). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data may be separate from other users' sales data regardless of the employers of each user, some data may be organization-wide data shared or accessible by a plurality or all of the sales three for a given organization that is a tenant. Thus, there may be some data structures managed by MTS 16 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 16 might also maintain system level data usable by multiple tenants. Such system level data might include industry reports, news, postings, and the like that are sharable among tenants.

In certain aspects, client systems 12 communicate with application servers 600 to request and update system-level and tenant-level data from MTS 16 that may require one or more queries to database system 606 and/or database system 608. In some embodiments, MTS 16 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc. As discussed above, a given table may be shared by multiple tenants.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   encrypting, by a computing system, data for a database in a multi-tenant database system, wherein the encrypting uses encryption keys assigned to respective tenants that are using the database;
   storing the encryption keys in a cache, including caching mappings of tenant identifier tags to key identifiers and caching mappings of key identifier tags to key material;

in response to a data access request from a first tenant, determining a key identifier and key material for the first tenant, based in the mappings stored in the cache;
retrieving encrypted data, corresponding to the data access request, from a database storage element;
decrypting retrieved data using the key material; and
in response to a key rotation request for the first tenant, the computing system invalidating an entry in the cache that maps a first tenant identifier of the first tenant to a first key identifier, prior to deletion of the key material specified by the first key identifier.

2. The method of claim 1, wherein the caching the mappings of tenant identifier tags to key identifiers is performed by a database system of the computing system and wherein the caching the mappings of mappings of key identifier tags to key material is performed by a key management system of the computing system.

3. The method of claim 1, further comprising:
blocking one or more writes for the first tenant until an entry for a new key for the first tenant is allocated in the cache.

4. The method of claim 3, further comprising:
performing one or more writes for one or more other tenants during the blocking, using stored encryption keys in the cache for the one or more other tenants.

5. The method of claim 1, further comprising:
generating a command for another node in a cluster to invalidate the first key identifier from its cache.

6. The method of claim 1, further comprising:
maintaining a list of tenants that have active data in memory associated with a flush or merge operation; and
in response to the list reaching a threshold number of tenants, issuing a bulk key fetch from a key management system and storing fetched keys from the bulk key fetch in the cache.

7. The method of claim 1, further comprising:
determining a number of tenants associated with the database; and
in response to the number of tenants being greater than a number of entries in the cache, selecting a portion of the tenants for a bulk key fetch into the cache, wherein the selected portion does not fill the cache.

8. The method of claim 1, wherein the encrypted data includes data from a database table that includes entries for multiple tenants, wherein the encrypted data includes a plurality of fragments, and wherein each fragment is encrypted using the encryption key of only one of the tenants.

9. A non-transitory computer-readable medium having computer instructions stored thereon that are capable of being executed by a computer system to cause operations comprising:
encrypting data for a database in a multi-tenant database system, wherein the encrypting uses encryption keys assigned to respective tenants that are using the database;
storing the encryption keys in a cache, including caching mappings of tenant identifier tags to key identifiers and caching mappings of key identifier tags to key material;
in response to a data access request from a first tenant, determining a key identifier and key material for the first tenant, based in the mappings stored in the cache;
retrieving encrypted data, corresponding to the data access request, from a database storage element;
decrypting retrieved data using the key material; and
in response to a key rotation request for the first tenant, invalidating an entry in the cache that maps a first tenant identifier of the first tenant to a first key identifier, prior to deletion of the key material specified by the first key identifier.

10. The non-transitory computer-readable medium of claim 9, wherein the caching the mappings of tenant identifier tags to key identifiers is performed by a database system of the computing system and wherein the caching the mappings of mappings of key identifier tags to key material is performed by a key management system of the computing system.

11. The non-transitory computer-readable medium of claim 9, wherein the operations further comprise:
blocking one or more writes for the first tenant until an entry for a new key for the first tenant is allocated in the cache.

12. The non-transitory computer-readable medium of claim 11, wherein the operations further comprise:
performing one or more writes for one or more other tenants during the blocking, using stored encryption keys in the cache for the one or more other tenants.

13. The non-transitory computer-readable medium of claim 9, wherein the operations further comprise:
generating a command for another node in a cluster to invalidate the first key identifier from its cache.

14. The non-transitory computer-readable medium of claim 9, wherein the operations further comprise:
maintaining a list of tenants that have active data in memory associated with a flush or merge operation; and
in response to the list reaching a threshold number of tenants, issuing a bulk key fetch from a key management system and storing fetched keys from the bulk key fetch in the cache.

15. The non-transitory computer-readable medium of claim 9, wherein the operations further comprise
determining a number of tenants associated with the database; and
in response to the number of tenants being greater than a number of entries in the cache, selecting a portion of the tenants for a bulk key fetch into the cache, wherein the selected portion does not fill the cache.

16. A system, comprising:
one or more processors; and
one or more memories having instructions stored thereon that are capable of being executed by the one or more processors to cause operations comprising:
encrypting data for a database in a multi-tenant database system, wherein the encrypting uses encryption keys assigned to respective tenants that are using the database;
storing the encryption keys in a cache, including caching mappings of tenant identifier tags to key identifiers and caching mappings of key identifier tags to key material;
in response to a data access request from a first tenant, determining a key identifier and key material for the first tenant, based in the mappings stored in the cache;
retrieving encrypted data, corresponding to the data access request, from a database storage element;
decrypting retrieved data using the key material; and
in response to a key rotation request for the first tenant, invalidating an entry in the cache that maps a first tenant identifier of the first tenant to a first key identifier, prior to deletion of the key material specified by the first key identifier.

17. The system of claim 16, wherein the caching the mappings of tenant identifier tags to key identifiers is performed by a database system and wherein the caching the mappings of mappings of key identifier tags to key material is performed by a key management system.

18. The system of claim 16, wherein the operations further comprise:
   blocking one or more writes for the first tenant until an entry for a new key for the first tenant is allocated in the cache.

\* \* \* \* \*